(12) United States Patent
Grundtvig et al.

(10) Patent No.: US 7,775,373 B2
(45) Date of Patent: Aug. 17, 2010

(54) METHOD AND A SYSTEM FOR BATCHING OF OBJECTS

(75) Inventors: Henrik Grundtvig, Risskov (DK); Mikael Krogh, Skodstrup (DK); Henrik F. Skyum, Skanderborg (DK); Ulrich Carlin Nielsen, Ry (DK)

(73) Assignee: Scanvaegt International A/S, Arhus N (DK)

( * ) Notice: Subject to any disclaimer, the term of this patent is extended or adjusted under 35 U.S.C. 154(b) by 389 days.

(21) Appl. No.: 11/721,221

(22) PCT Filed: Dec. 12, 2005

(86) PCT No.: PCT/DK2005/000784

§ 371 (c)(1),
(2), (4) Date: Aug. 31, 2007

(87) PCT Pub. No.: WO2006/061024

PCT Pub. Date: Jun. 15, 2006

(65) Prior Publication Data

US 2009/0223878 A1    Sep. 10, 2009

(30) Foreign Application Priority Data

Dec. 10, 2004    (DK) ................................ 200401922

(51) Int. Cl.
*B07C 5/16*    (2006.01)
*G05B 19/418*    (2006.01)
*B65G 15/12*    (2006.01)
*B65G 15/42*    (2006.01)

(52) U.S. Cl. ........................ 209/542; 209/592; 209/645; 198/468.2; 198/750.11; 177/145; 414/800

(58) Field of Classification Search ................... 53/501, 53/502; 177/25.18, 145; 198/750.11, 468.2; 209/542, 592, 645; 414/800
See application file for complete search history.

(56) References Cited

U.S. PATENT DOCUMENTS

| 4,428,179 | A | * | 1/1984 | Jordan et al. ................... 53/502 |
| 4,442,910 | A | * | 4/1984 | Mikami ................... 177/25.18 |
| 4,720,961 | A | * | 1/1988 | Jordan ......................... 53/502 |
| 4,780,830 | A | * | 10/1988 | Omi et al. ................... 700/219 |
| 4,811,551 | A | | 3/1989 | Nambu |
| 4,928,473 | A | * | 5/1990 | Nagao et al. ................... 53/53 |
| 4,957,199 | A | * | 9/1990 | Wokke et al. ............... 198/847 |
| 5,004,093 | A | * | 4/1991 | Blezard ....................... 198/430 |

(Continued)

FOREIGN PATENT DOCUMENTS

DE    69802786 T2    12/2001

(Continued)

OTHER PUBLICATIONS

International Search Report, dated Feb. 7, 2006.

(Continued)

*Primary Examiner*—Randy W Gibson
(74) *Attorney, Agent, or Firm*—Pearne & Gordon LLP

(57) ABSTRACT

Method and system for batching of supplied objects in batches using one or more robots and a plurality of conveyors in such a manner that a batch fulfils predefined criteria as regards the number of objects, weight, orientation and/or type(s) of objects.

43 Claims, 5 Drawing Sheets

U.S. PATENT DOCUMENTS

Figure 3:
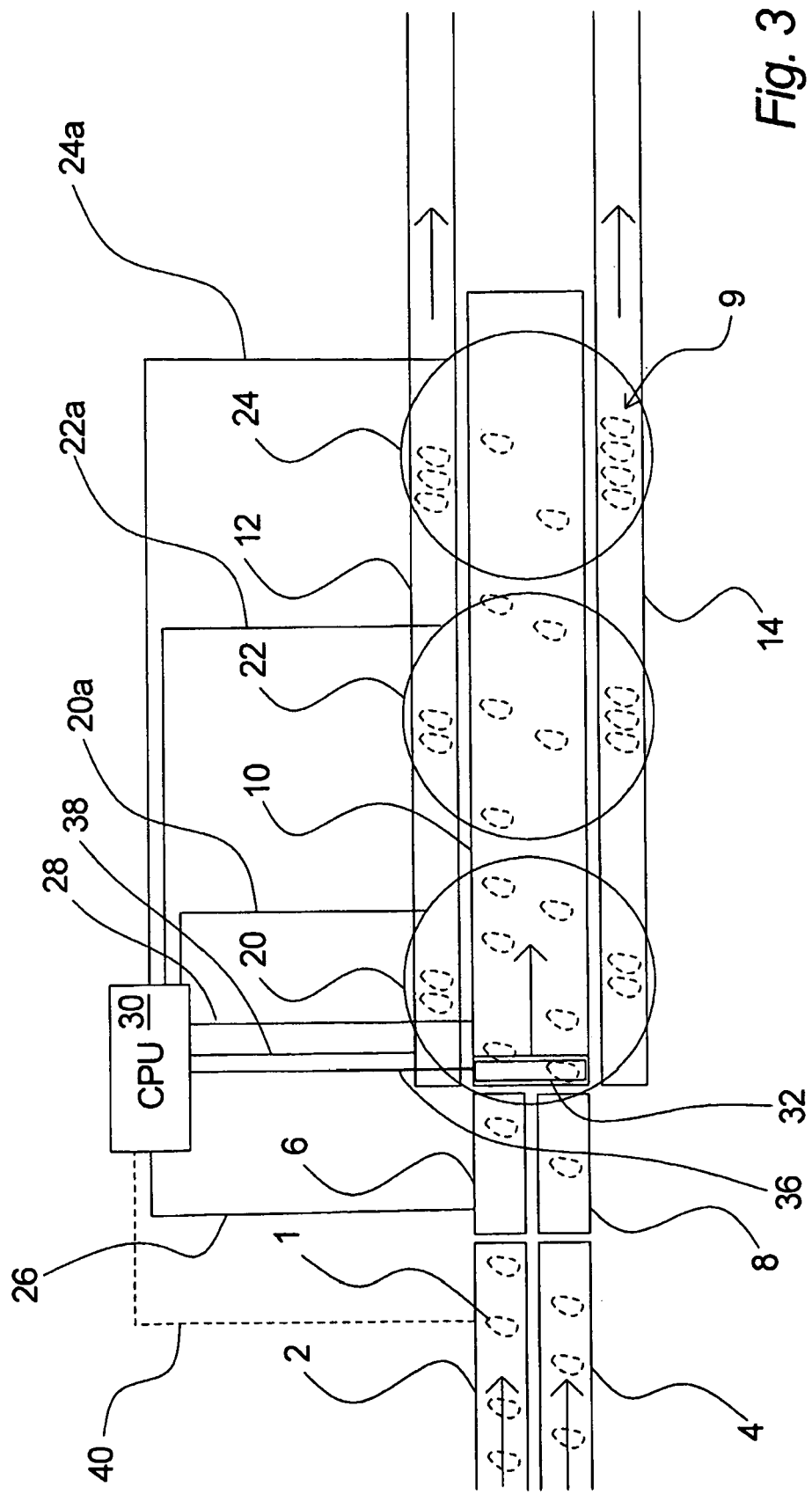

| | | | |
|---|---|---|---|
| 5,092,414 A * | 3/1992 | Blezard .................. 177/52 |
| 5,340,269 A * | 8/1994 | Caridis et al. ............. 414/800 |
| 5,401,160 A * | 3/1995 | Bellettato ................ 425/397 |
| 5,998,740 A * | 12/1999 | Kvisgaard et al. ........ 177/25.18 |
| 6,122,895 A | 9/2000 | Schubert |
| 6,151,866 A * | 11/2000 | Connell .................... 53/443 |
| 6,164,174 A | 12/2000 | Sigurdsson et al. |
| 6,201,203 B1 * | 3/2001 | Tilles ..................... 209/584 |
| 6,285,918 B1 * | 9/2001 | Kono ...................... 700/240 |
| 6,371,280 B1 * | 4/2002 | Lindner .................. 198/690.2 |
| 6,374,984 B1 | 4/2002 | Nagler |
| 6,533,125 B1 * | 3/2003 | Jensen .................... 209/592 |
| 6,536,599 B1 * | 3/2003 | Nielsen ................... 209/540 |
| 6,712,221 B2 * | 3/2004 | Kvisgaard et al. ......... 209/645 |
| 6,881,907 B2 * | 4/2005 | Winkelmolen ............. 177/145 |
| 6,978,882 B2 * | 12/2005 | Nagler ................... 198/750.11 |
| 7,004,331 B2 * | 2/2006 | Tew et al. ................ 209/645 |
| 7,258,237 B2 * | 8/2007 | Nielsen ................... 209/645 |
| 7,279,644 B1 * | 10/2007 | Kasel .................... 177/25.13 |
| 7,461,759 B2 * | 12/2008 | Guerra .................... 221/93 |
| 2009/0129910 A1 * | 5/2009 | Grundtvig ............... 414/751.1 |
| 2009/0145670 A1 * | 6/2009 | Grundtvig et al. ........... 177/1 |
| 2009/0223878 A1 * | 9/2009 | Grundtvig et al. ........... 209/617 |

FOREIGN PATENT DOCUMENTS

| | | |
|---|---|---|
| EP | 0856465 B1 | 8/1998 |
| EP | 0781172 B1 | 7/2002 |
| EP | 1352831 B1 | 10/2003 |
| GB | 2116732 A | 9/1983 |
| WO | 95/35238 | 12/1995 |
| WO | 00/23771 | 4/2000 |
| WO | 01/22043 A2 | 3/2001 |

OTHER PUBLICATIONS

Khodabandehloo K., "Benefits of Expert Robots: Intelligence vs. Skill", NATO ASI Series, Series F: Computer Systems Sciences (Expert Systems and Robotics), vol. F71, 1991, pp. 673-697, XP002366150 Springer Verlag, Berlin Heidelberg, DE ISSN: 0258-1248.

Khodabandehloo K., "Robotics in Meat, Fish and Poultry Processing. Chapter 4: Robotic packaging of poultry products", Sep. 1992, Blackie Academic & Professional, XP002366151.

Decision on Grant for Appl. Serial No. 2007125969 dated Aug. 14, 2009.

* cited by examiner

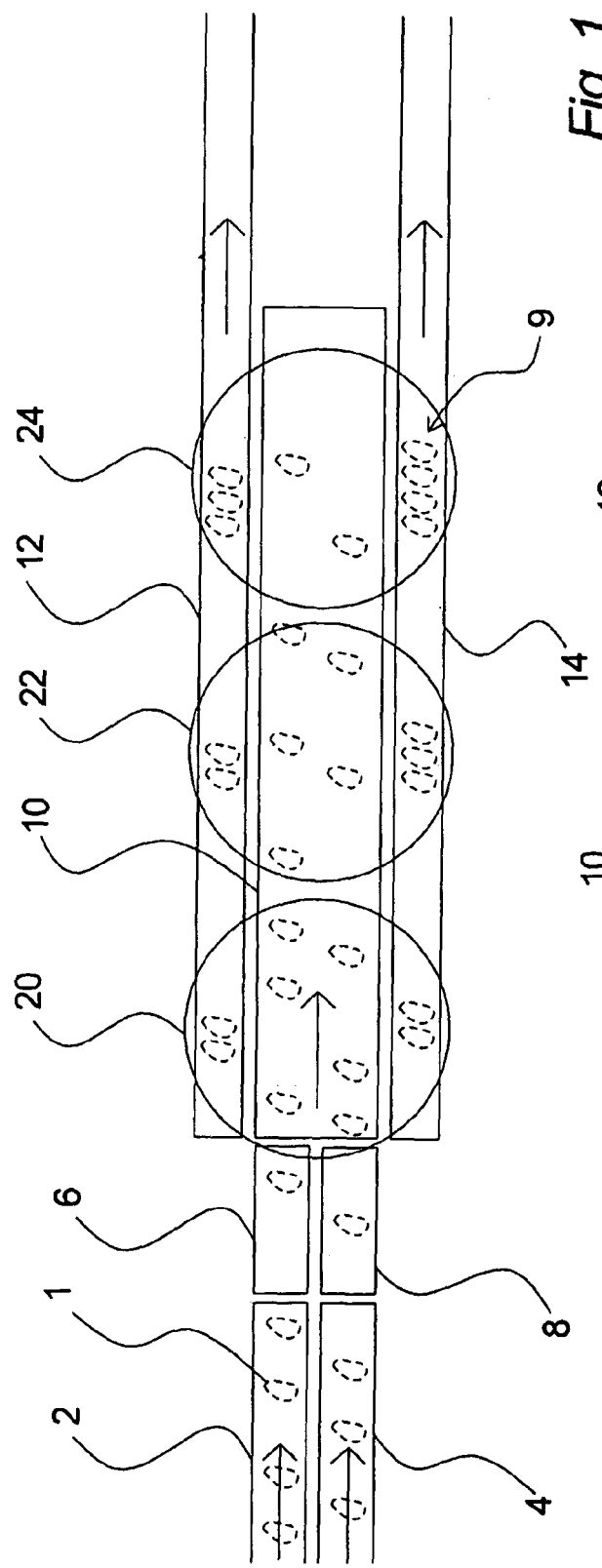
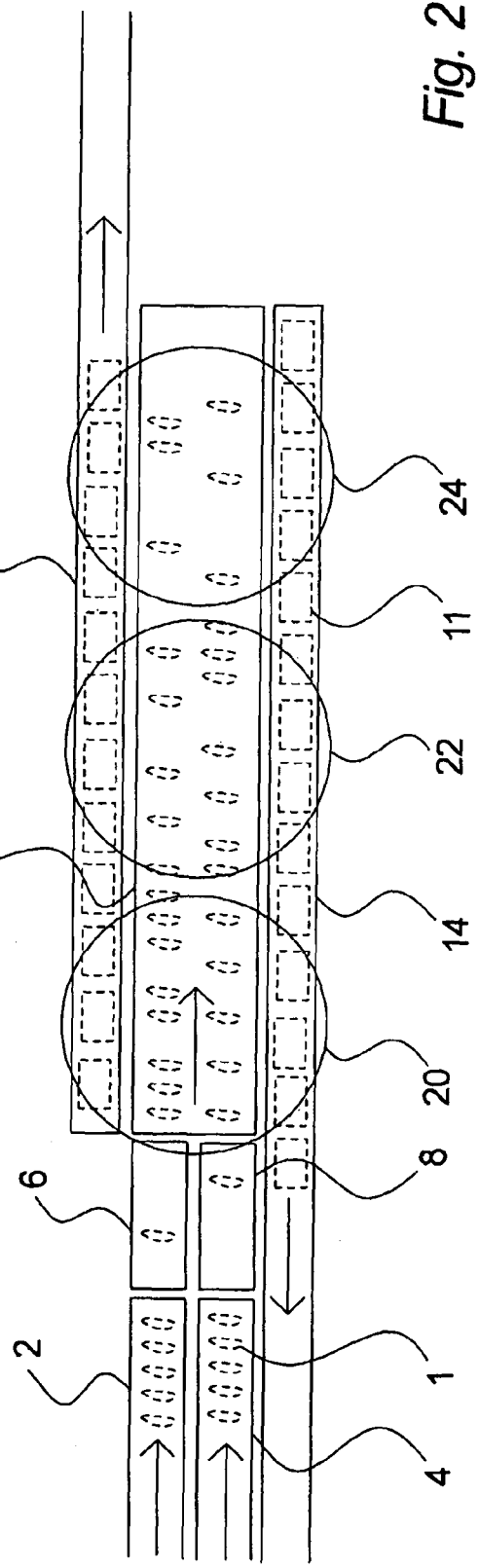

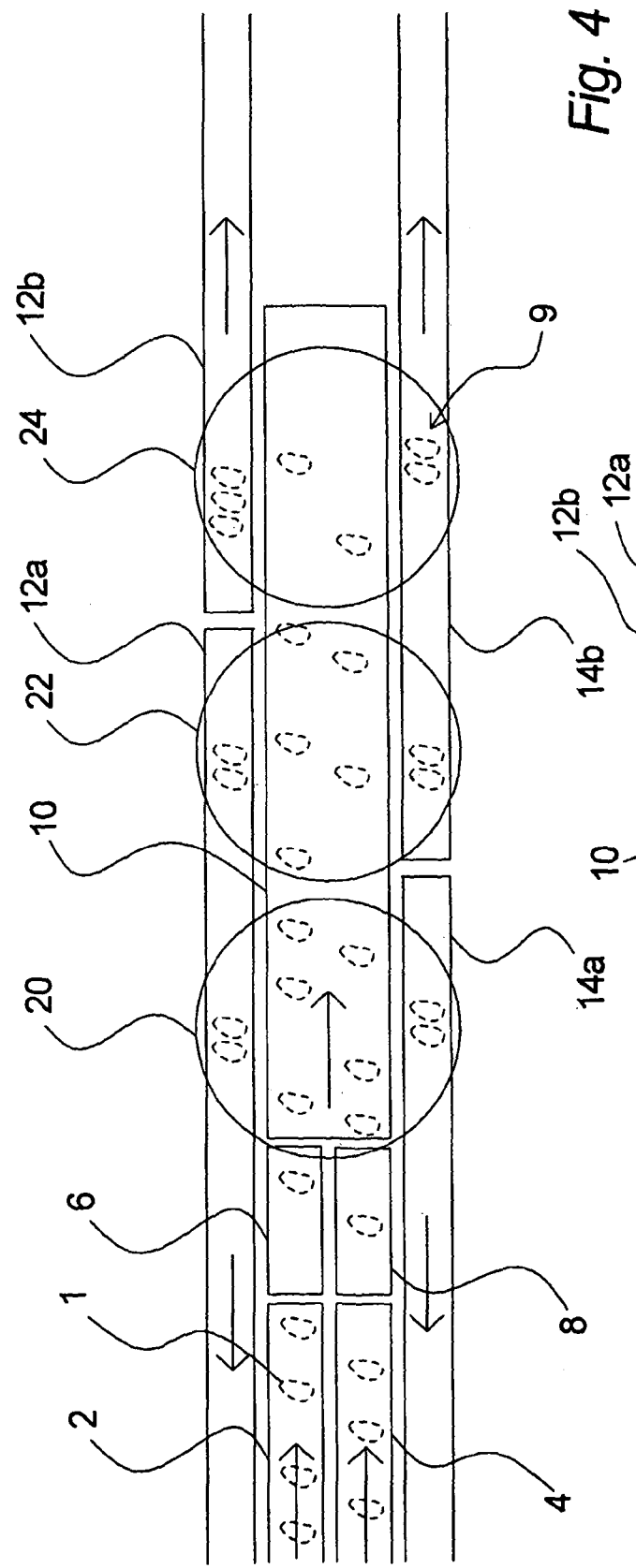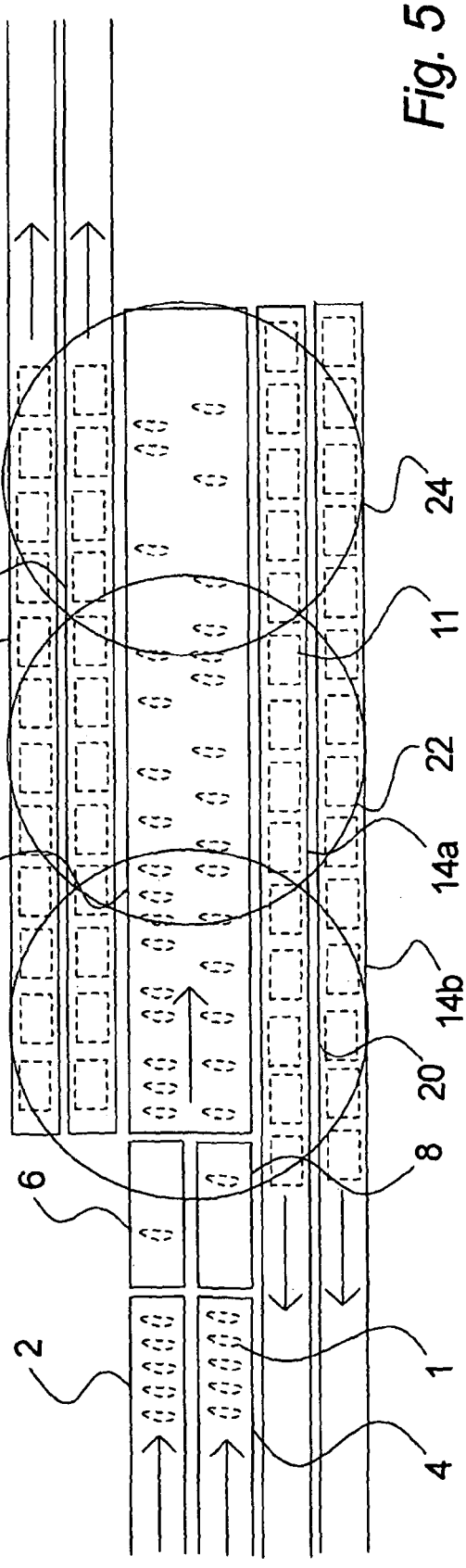

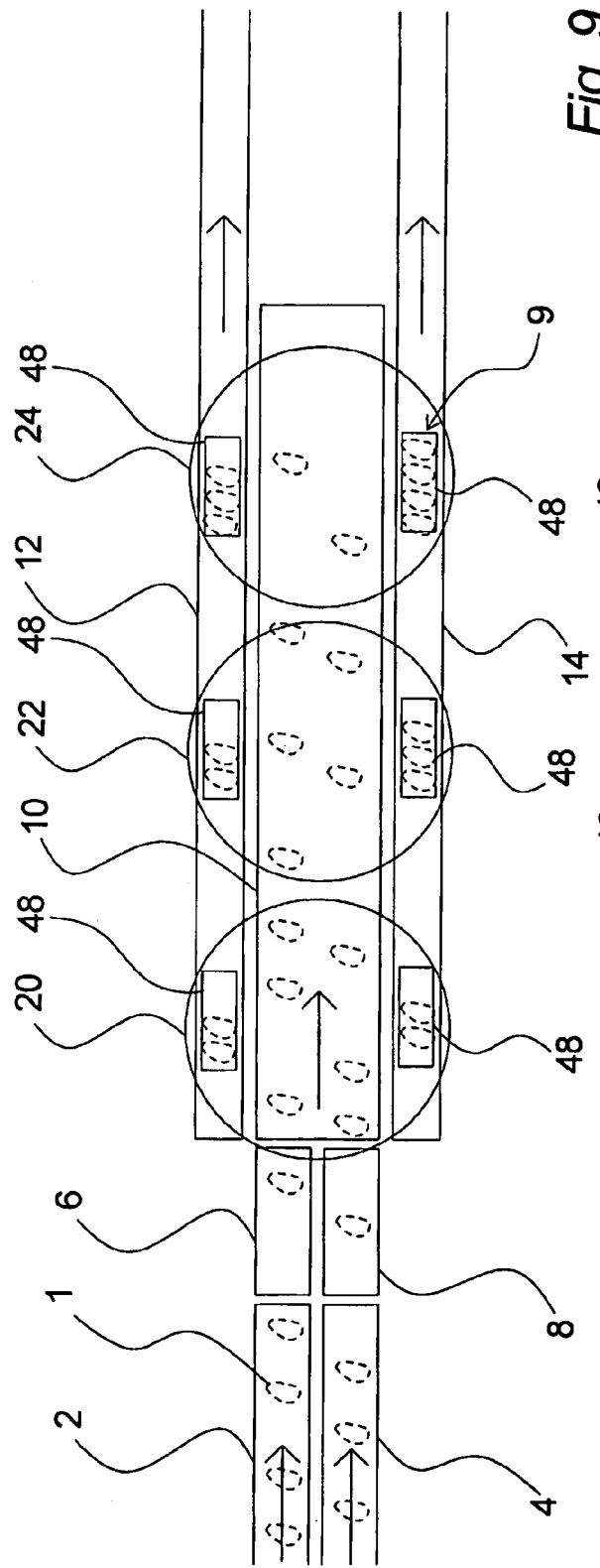
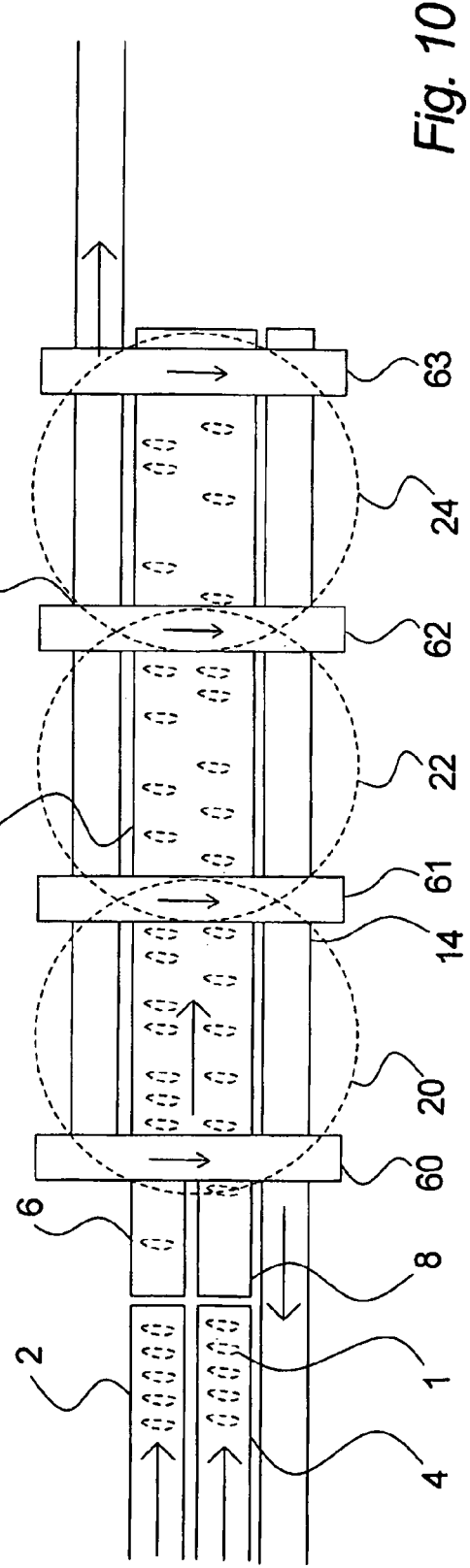

METHOD AND A SYSTEM FOR BATCHING OF OBJECTS

FIELD OF THE INVENTION

The invention relates to a method and a system for batching of supplied objects in batches in such a manner that a batch fulfils predefined criteria as regards the total weight range and optionally the number of objects, weight, orientation and/or type(s) of objects and wherein use is made of handling means of the robot type.

BACKGROUND OF THE INVENTION

Batching of objects such as for example food product in order to produce batches that for example fulfil predefined criteria as regards e.g. the total weight are well-known within the prior art, cf. for example GB 2 116 732 and EP 781 172 and WO 00/23771 that describe systems, wherein the food items are transported on a conveyor belt and wherein the items are selectively transferred to a plurality of receiver stations, where the batches are formed.

Further, the use of a robot in connection with batching of objects such as foodstuff items has also been suggested in connection with prior art systems.

For example, WO 95/35238 A discloses a method and a system for forming weighed batches of foodstuff articles wherein a robot is used for transferring selected foodstuff items to a carrier plate. However, according to this prior art, the robot and the system is arranged in such a manner that the robot picks up the items one by one and delivers the items to the carrier plate. Thus, the robot is only able to deposit the transferred items to a single location placed in the vicinity of the robot and in the same order as the items are forwarded to the robot.

Further, in "BENEFITS OF EXPERT ROBOTS: INTELLIGENCE vs. SKILL" by K. Khodabandehloo ("Expert Systems and Robotics", Springer-Verlag Berlin Heidelberg, 1991) and in "Robotic packaging of poultry products", also by K. Khodabandehloo ("Robotics in Meat, Fish and Poultry Processing", Routledge, 1992), the use of a single robot in a batching system has been suggested. These two documents both suggest an application for a robotic system for fixed-weight-fixed-price packaging of fresh portions of poultry and in particular chicken. Chicken portions, e.g. chicken breasts, are mechanically weighed and the weight information is transmitted to a computer controlling the robotic cell. The computer controls the robot in such a manner that a predefined number of portions having (at least) a predefined total weight (and with a minimum excess weight) are assembled on a tray. Cameras are used for detecting the position of the individual portions, e.g. in order to aid the robot in gripping the items.

Still further, in WO 01/22043 the use of robot technique for effecting the transfer of items to selected receiving stations, where the batches are formed, is disclosed.

It is an object of the present invention to present a method and a system for batching of objects, which provides a more flexible and efficient batching in comparison with the above-mentioned prior art.

Thus, it is an object of the present invention to present such a method and such a system, by means of which a more effective handling of the produced batches or packages can be provided.

Further, it is an object of the present invention to present such a method and such a system, by means of which the selected objects for a batch can be placed in e.g. predetermined and/or orderly form, and whereby the produced batches may be processed further, e.g. packaged etc. without disturbing or interfering with the form or "layout" of the produced batches.

In particular, it is an object of the invention to provide such a method and such an apparatus, which is suitable for selecting and placing objects, which "belong together in an assembly" on a conveyor in such a manner that they can be transferred to a desired packaging, tray etc. or possibly in such a manner that the objects are placed directly on or in a desired packaging, tray etc. Such objects that may be said to "belong together in an assembly" may for example be objects that together has a predefined mass or weight (for example 1 kg), but other criteria may also be used. Such an example may for example be a package comprising chicken parts, e.g. prepared and ready for putting in the oven, where a package comprises two chicken thighs, two chicken legs ("drumsticks"), two chicken wings and two chicken breast parts.

Further, it is an object of the present invention to provide such a method and such an apparatus, which provides improvements in relation to the prior art systems as regards the speed with which a flow of objects may be transferred to batches or packages, while simultaneously providing the effect that the objects may be placed in the batches or packages in an orderly form.

Still further, it is an object of the present invention to provide such a method and such an apparatus, by means of which an effective handling of different batches or packages, e.g. batches having different target weights, is facilitated.

These and other objects are achieved by the invention as explained in further detail in the following.

SUMMARY OF THE INVENTION

The invention relates to a method of batching supplied objects in batches in such a manner that a batch fulfils predefined criteria as regards the total weight range and optionally the number of objects, weight, orientation and/or type(s) of objects, wherein the weight of each object is determined the objects are transported by means for object transport, a selective transferral of the objects from said means for object transport to batching means is performed by means of a plurality of handlings means of the robot type in as a group or batch of objects is produced in consideration of said predefined criteria, and wherein said group or batch of objects is transported further on by means of means for batch transport.

Hereby, it is achieved that the objects may expediently be transferred to the batching means for building up of batches or packages, which may be built up in an orderly form since the handling means are of the robot type and therefore configured for placing the objects in a desired manner, e.g. in relation to other objects, e.g. as regards the orientation of the objects, and/or in relation to the batching means. Further, it is achieved that since a group, package or batch of objects is transported further on by means of means for batch transport, the objects will be transported essentially in the same order and form as they have been placed in by the handling means of the robot type.

According to a particular advantageous embodiment as specified in claim 2, said means for batch transportation may comprise a plurality of conveyor means.

Hereby, it is achieved that an efficient handling of the produced batches are facilitated and that it is facilitated that different batches or packages may be formed for different conveyors of the means for batch transportation. For example, if different batches are produced, for example having different weights, these may efficiently be handled by different conveyors, and further, if different package means, e.g. trays, are used for these different batches, these package means may readily be provided to the respective conveyors without causing any risk of mixing the respective package means etc. Further, when a plurality of conveyors are used for transporting batches, it will be possible to stop one of the conveyors, for example if a batch on this conveyor has not been finished within a prescribed time limit, in order to allow a suitable object to be forwarded, without putting the entire batching to a halt.

Preferably, as specified in claim 3, the objects may be supplied to said means for object transport by means of supply transportation equipment such as one or more conveyor bands.

It will be understood that the objects may be placed on said means for object transport, from which they are transferred by the handling means of the robot type, in any suitable manner, including conveyor(s). However, since it is desired to have a fairly wide conveyor as the means for object transport, it is particularly advantageous if a plurality of conveyors are used for supplying the objects hereto, thus e.g. providing objects in the full width of the means for object transport and thereby also providing a sufficient number of objects for each of the robots to choose from.

Advantageously, as specified in claim 4, the objects may be registered, for example as regards position, type and/or orientation, e.g. by means of vision equipment, scanning means or the like, said registration being performed in connection with e.g. the determination of the weight or the transfer to said means for object transport.

Hereby, it is achieved that when the objects enter the means for object transport, e.g. the operation area for the batching, the relevant data for each object will be known, e.g. registered in a central control unit, and thus a decision may be made as regard whereto a specific object should be transferred at an early stage.

According to an advantageous embodiment as specified in claim 5, the objects may be batched directly on said means for batch transport in as at least part of said means for batch transportation constitutes said batching means.

Hereby, it is achieved that the batches or packages may readily be transported further on without disturbing the form, in which the objects have been placed. It is noted that the means for batch transportation and thus also the batching means may be moving while the batching is performed, thus providing a steady flow of batches and providing predetermined conditions for the batching, e.g. it is predetermined that a specific batch must (preferably) be finished within a time limit, but also that new batch opportunities emerge within known time limits.

According to an alternative, advantageous embodiment as specified in claim 6, the objects may be batched on a separate unit that constitutes said batching means, where after a batch of objects is transferred to said means for batch transportation, for example by means of an essentially vertical movement, a pivoting movement and/or a displacement in relation to said separate unit, e.g. a transportation by means of a conveyor on said separate unit.

Hereby, it is achieved that the time limit within which a specific batch must have been completed, is not limited, which may be advantageous if for example objects which differ significantly in e.g. weight are batched, thus inducing the risk that an object that has a weight that allows a specific batch to be completed without an undesired overweight (giveaway weight) may not be readily available on the means for object transport. In such an instance, it will be possible to wait for the right object without delaying the operation, e.g. the building up of other batches.

Preferably, as specified in claim 7, the objects may be batched in such a manner that they will be located in a predefined orderly form in relation to each other and possibly in relation to the means for batch transportation.

Since handling means of the robot type are used, it will be possible to achieve that the individual object can be placed in a desired manner, controlled by a central control unit.

Advantageously, as specified in claim 8, said means for object transport and/or said means for batch transportation may be moved continuously during the batching of the objects.

Hereby, it is achieved that the position of the objects on the means for object transport may be relatively easily determined as a function of time and/or that the same applies for the position on the means for batch transportation, where a specific batch is being formed.

According to an alternative, advantageous embodiment as specified in claim 9, said means for object transport and/or said means for batch transportation may be moved discontinuously during the batching of the objects.

Hereby, it is achieved that the conveyor(s) may be halted or reduced (or even enhanced) in speed if it is deemed to be necessary, for example if a batch has not been completed within the specific time limit, thereby allowing the batch to be completed.

Preferably, as specified in claim 10, said means for object transport may comprise one or more conveyor bands.

Hereby, it is achieved that the means for object transport may be provided using e.g. standard conveyors and further that it will be possible to e.g. increase the capacity of the method by adding one or more further conveyor(s).

Advantageously, as specified in claim 11, one or more of said conveyor means forming part of said means for batch transportation may be moved in an opposite direction of said means for object transport.

Hereby, it is achieved that the arrangement may be laid out in suitable manner, e.g. in view of the customer requirements. Further, it is noted that the conveyor means forming part of said means for batch transportation may comprise two or more conveyors at each side of the means for object transport, and that one of these may be moving in the opposite direction of the other, whereby for example different batches or packages made on these conveyors may be transported separately, thereby enabling an efficient and product-oriented arrangement.

Further, as specified in claim 12, one or more of said conveyor means forming part of said means for batch transportation may be moved in the same direction as said means for object transport.

According to an advantageous embodiment as specified in claim 13, a batch of objects may be transferred from said means for batch transportation to a packaging means such as e.g. a tray.

Hereby, it is achieved that the means for packaging said batches, e.g. trays etc. may be supplied at a later stage, for example from a supply, either manually or automatically, and that the batches may be transferred to the e.g. trays here, preferably automatically, whereafter the packaging is completed, e.g. supplied with wrapping, covering, labels etc.

According to a still further advantageous embodiment as specified in claim 14, a batch of objects may be batched directly in or on a packaging means such as e.g. a tray, which is placed or has been placed (e.g. in advance) on said means for batch transportation or said batching means.

Hereby, it is achieved that the means for packaging said batches, e.g. trays etc. may be supplied directly to the batching means, for example the conveyors forming part of the batching means, for example from a supply, either manually or automatically, thus giving the advantage that the objects are placed directly on e.g. the packaging means and that the objects need not be handled further before the packaging is completed, e.g. supplied with wrapping, covering, labels etc.

Advantageously, as specified in claim 15, a batch of objects may be redirected to a feeding end of said means for batch transportation for corrective action, for example supplying of one or more missing objects.

Hereby, it is achieved that if a batch can not be completed within the relevant time limit, it will not be necessary to stop the advancement of the relevant conveyor in order to complete the batch or alternatively discard the unfinished batch, but instead the unfinished batch can be redirected.

Further, the invention also relates to a system for batching of supplied objects in batches in such a manner that a batch fulfils predefined criteria as regards the number of objects, weight, orientation and/or type(s) of objects, wherein the system comprises means for registration of the objects, for example as regards position, type and/or orientation,
  means for determination of the weight of the objects,
  means for transport of the objects,
  a plurality of controllable handlings means of the robot type for selective transfer of objects from said means for transport of the objects to a batch of objects,
  means for batch transportation for further transport of said group or batch of objects, and
  a control unit for controlling said controllable handlings means of the robot type in consideration of said predefined criteria and on the basis of registered and/or determined data for the objects.

Hereby, it is achieved that the objects may expediently be transferred to the batching means for building up of batches or packages, which may be built up in an orderly form since the handling means are of the robot type and therefore configured for placing the objects in a desired manner, e.g. in relation to other objects, e.g. as regards the orientation of the objects, and/or in relation to the batching means. Further, it is achieved that since a group, package or batch of objects is transported further on by means of means for batch transport, the objects will be transported essentially in the same order and form as they have been placed in by the handling means of the robot type, controlled by the control unit.

According to a particular advantageous embodiment as specified in claim 17, said means for batch transportation may comprise a plurality of conveyor means.

Hereby, it is achieved that an efficient handling of the produced batches are facilitated by means of the system and that it is facilitated that different batches or packages may be formed for different conveyors of the means for batch transportation. For example, if different batches are produced, for example having different weights, these may efficiently be handled by different conveyors, and further, if different package means, e.g. trays, are used for these different batches, these package means may readily be provided to the respective conveyors without causing any risk of mixing the respective package means etc. Further, when a plurality of conveyors are used for transporting batches, it will be possible to stop one of the conveyors, for example if a batch on this conveyor has not been finished within a prescribed time limit, in order to allow a suitable object to be forwarded, without putting the entire batching to a halt.

Advantageously, as specified in claim 18, the system may comprise supply transportation equipment such as one or more conveyor bands for supplying the objects.

It will be understood that the objects may be placed on said means for object transport, from which they are transferred by the handling means of the robot type, in any suitable manner, including conveyor(s). However, since it is desired to have a fairly wide conveyor as the means for object transport, it is particularly advantageous if a plurality of conveyors are used for supplying the objects hereto, thus e.g. providing objects in the full width of the means for object transport and thereby also providing a sufficient number of objects for each of the robots to choose from.

Preferably, as specified in claim 19, the system may comprise vision equipment, scanning means or the like for registering said objects, said registration being performed in connection with e.g. the determination of the weight or the transfer to said means for object transport.

Hereby, it is achieved that when the objects enters the means for object transport, e.g. the operation area for the batching, the relevant data for each object will be known, e.g. registered in a central control unit, and thus a decision may be made as regard whereto a specific object should be transferred at an early stage.

According to an advantageous embodiment as specified in claim 20, the system may be configured in such a manner that the objects are batched directly on said means for batch transport.

Hereby, it is achieved that the batches or packages may readily be transported further on without disturbing the form, in which the objects have been placed. It is noted that the means for batch transportation and thus also the batching means may be moving while the batching is performed, thus providing a steady flow of batches and providing predetermined conditions for the batching, e.g. it is predetermined that a specific batch must (preferably) be finished within a time limit, but also that new batch opportunities emerge within known time limits.

Preferably, as specified in claim 21, said controllable handlings means of the robot type may be controlled in such a manner that the objects are batched in a predefined orderly form in relation to each other and possibly in relation to the means for batch transportation.

Since handling means of the robot type are used, it will be possible to achieve that the individual objects can be placed in a desired manner, controlled by a central control unit.

Advantageously, as specified in claim 22, said means for object transport and/or said means for batch transportation may be configured for moving continuously during the batching of the objects.

Hereby, it is achieved that the position of the objects on the means for object transport may be relatively easily determined as a function of time and/or that the same applies for the position on the means for batch transportation, where a specific batch is being formed.

Alternatively, as specified in claim 23, said means for object transport and/or said means for batch transportation may be configured for moving discontinuously during the batching of the objects.

Hereby, it is achieved that the conveyor(s) may be halted or reduced (or even enhanced) in speed if it is deemed to be necessary, for example if a batch has not been completed within the specific time limit, thereby allowing the batch to be completed.

Preferably, as specified in claim 24, said means for object transport may comprise one or more conveyor bands.

Hereby, it is achieved that the means for object transport may be provided using e.g. standard conveyors and further that it will be possible to e.g. increase the capacity of the system by adding one or more further conveyor(s).

Advantageously, as specified in claim 25, one or more of said conveyor means forming part of said means for batch transportation may be adapted for moving in an opposite direction of said means for item transport.

Hereby, it is achieved that the system may be configured in a suitable manner, e.g. in view of the customer requirements. Further, it is noted that the conveyor means forming part of said means for batch transportation may comprise two or more conveyors at each side of the means for object transport, and that one of these may be moving in the opposite direction of the other, whereby for example different batches or packages made on these conveyors may be transported separately, thereby enabling an efficient and product-oriented arrangement.

Further, as specified in claim 26, one or more of said conveyor means forming part of said means for batch transportation may be adapted for moving in the same direction as said means for object transport.

Advantageously, as specified in claim 27, said controllable handlings means of the robot type may comprise gripping, picking or lifting means etc. for gripping etc. the objects from the means for item transport.

According to an advantageous embodiment as specified in claim 28, said one or more conveyor belts forming part of said means for object transport may be a type with longitudinal separate elements, for example of a polycord conveyor type.

Hereby, a number of advantages are achieved, since for example handling means comprising rods or the like may be e.g. lowered through such a conveyor belt.

According to another advantageous embodiment as specified in claim 29, said one or more conveyor bands forming part of said means for item transport may be a type with elevations, for example knobs, spikes, longitudinal elevations etc.

Hereby, it is achieved that the objects are lifted a predetermined distance from the basis of the conveyor belt, allowing e.g. handling means to be inserted under the objects in order to lift the objects.

Advantageously, as specified in claim 30, said controllable handling means of the robot type may comprise finger means for gripping the objects from the means for object transport, in as said finger means are essentially horizontally oriented with a mutual distance allowing the finger means to be lowered down between said longitudinal separate elements and/or said elevations.

Hereby, the handling, e.g. lifting of the objects may be performed with relatively simple means.

According to a further advantageous embodiment as specified in claim 31, the system may comprise batching means, whereon the objects can be batched, said batching means being designed and controllable in such a manner that a batched assembly of objects can be transferred to said means for batch transportation.

Hereby, it is achieved that batches may be built up independently of the e.g. conveyors forming the means for batch transportation.

According to a still further advantageous embodiment as specified in claim 32, said batching means may comprise one or more separate conveyors, which are arranged to be immovable when a batching of objects to such a separate conveyor takes place.

Hereby, it is achieved that batches may be built up independently of the e.g. conveyors forming the means for batch transportation and that a batch will not have to be finished within a specific time limit.

Advantageously, as specified in claim 33, said one or more separate conveyors may be located essentially above said means for batch transportation and may be rotated and/or tilted in such a manner that a batch of objects can be transported down onto said means for batch transportation.

Hereby, a completed batch may relatively easily be transferred to the means for batch transportation while maintaining the orderly form, in which the batch has been formed by the handling means of the robot type.

Advantageously, as specified in claim 34, said means for batch transportation may comprise conveyor bands of a type having longitudinal separate elements, for example of a polycord conveyor type, and/or conveyor bands of a type with elevations, for example knobs, spikes, longitudinal elevations etc.

Hereby, a number of advantages are achieved, since for example handling means comprising rods or the like may be lowered down below the level of the objects, e.g. through such a conveyor belt or between the elevations.

Further, as specified in claim 35, said batching means may comprise one or more support units, which comprises rakes or finger elements, which are essentially horizontally oriented, said support units are movable in a vertical direction, and wherein said rakes or finger element can pass between said longitudinal separate elements on the conveyor belt or can be lowered down between said elevations on the conveyor belt.

Hereby, it is achieved that batches may be built up independently of the e.g. conveyors forming the means for batch transportation and that a batch will not have to be finished within a specific time limit. Further, the transfer of a completed batch to the conveyor is facilitated in an expedient manner.

Advantageously, as specified in claim 36, said system may be configured in such a manner that a batch of objects can be transferred from said means for batch transportation to a packaging means such as e.g. a tray.

Hereby, it is achieved that the means for packaging said batches, e.g. trays etc. may be supplied at a later stage, for example from a supply, either manually or automatically, and that the batches may be transferred to the e.g. trays here, preferably automatically, whereafter the packaging is completed, e.g. supplied with wrapping, covering, labels etc.

According to a particular advantageous embodiment as specified in claim 37, said system may be configured in such a manner that a batch of objects can be batched directly in or on a packaging means such as e.g. a tray, which is placed or has been placed on said means for batch transportation or said batching means.

Hereby, it is achieved that the means for packaging said batches, e.g. trays etc. may be supplied directly to the batching means, for example the conveyors forming part of the batching means, for example from a supply, either manually or automatically, thus giving the advantage that the objects are placed directly on e.g. the packaging means and that the objects need not be handled further before the packaging is completed, e.g. supplied with wrapping, covering, labels etc.

Advantageously, as specified in claim 38, the system may comprise means for redirecting a batch of objects to a feeding end of said means for batch transportation for corrective action, for example supplying of one or more missing objects.

Hereby, it is achieved that if a batch can not be completed within the relevant time limit, it will not be necessary to stop the advancement of the relevant conveyor in order to complete the batch or alternatively discard the unfinished batch, but instead the unfinished batch can be redirected.

According to a further particular advantageous embodiment as specified in claim 39, the system may be configured for batching of batches of different types, for example different weight, preferably on different conveyors belts of said means for batch transportation.

Hereby, it may readily be possible to batch different batches in an expedient manner. Further, it is emphasized that when batching two or more different package sizes, e.g. packages with different total weights, a further advantage is achieved since the packages may be assembled with actual weights being closer to the target weight, meaning that the give-away, i.e. the weight which exceeds the target weight, can be reduced. If for example only one size packages are batched having four objects and a target weight of 600 g, and the mean weight of the objects are 160 g, it is clear that the batching will result in a considerable amount of give-away. However, if it is possible to provide for the batching of another package size with a target weight of for example 700 g, a number of packages with such a target weight may be produced simultaneously, using predominantly the objects with the higher weight for these, and whereby the packages having a target weight of 600 g may be produced with a lower give-away weight.

Advantageously, as specified in claim 40, the system may comprise two or more, for example three, four, five etc., of said controllable handling means of the robot type Hereby, it is achieved that the system may be configured for corresponding to specific customer-specifications, e.g. objects pr. minute, and that the system may further readily be altered e.g. in order to meet higher productivity requirements, for example by adding further robots and e.g. prolonging the conveyor(s) constituting the means for batch andor object transport.

According to an advantageous embodiment as specified in claim 41, said means for batch transport, for example in the form of one or more parallel conveyor belts, may be arranged essentially in parallel with said means for object transportation, for example with a conveyor belt placed on each side of the means for object transportation.

Hereby, the elements of the system may be placed in a manner providing added efficiency and user-friendliness.

Advantageously, as specified in claim 42, said conveyor belts may be arranged essentially in parallel with each other in an area corresponding at least to the operation area for said controllable handling means of the robot type.

Hereby, the elements of the system may be placed in a manner providing an optimal working condition for the handling means of the robot type According to an advantageous embodiment as specified in claim 43, the system may comprise four conveyor belts forming part of said means for batch transportation, said four conveyor belts being arranged with two on each side of the means for item transport and in such a manner that the two conveyor belts on each side is moved in opposite directions.

Hereby, it is achieved that the system may be laid out in suitable manner, e.g. in view of the customer requirements. Further, for example a plurality of different batches or packages made on these conveyors or transferred hereto may be transported separately, thereby enabling an efficient and product-oriented arrangement.

According to a still further advantageous embodiment, said means for batch transport, for example in the form of one or more conveyor belts, may comprise conveyors for batch transportation essentially in parallel with the means for object transportation as well as conveyors for batch transportation essentially transversely to the means for object transportation.

Hereby, it is achieved that batches may be built up not only on two sides of each e.g. robot, but on four (or more) sides, thereby increasing the number of possibilities for delivering a specific object and thus also increasing the possibility of achieving batches that fulfil the predetermined criteria "spot-on" or near "spot-on". Further, it is achieved that if the system is designed to stop a given conveyor if a batch is not completed within the specified time limit, this will not be as critical as in the situation where conveyors are placed on two sides only. According to this embodiment of the invention, a given robot will still be able to batch to conveyors placed on three sides, while the fourth conveyor waits for the uncompleted batch to be finished.

THE FIGURES

Figure 6:
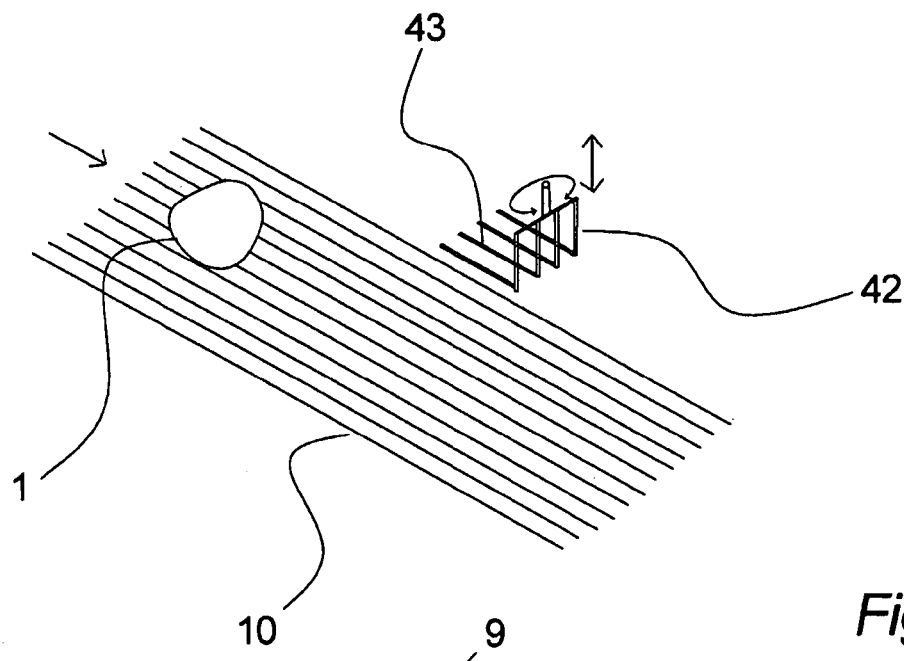
Figure 7:
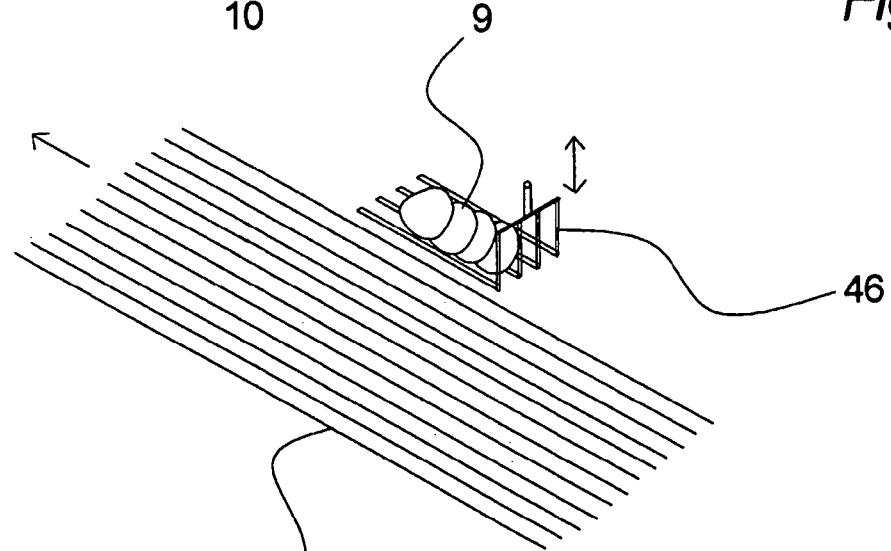
Figure 8:
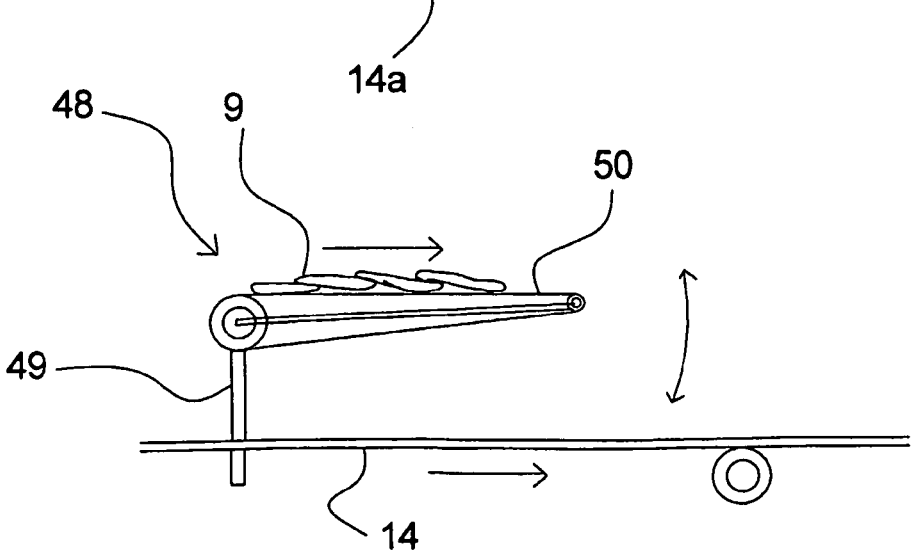

The invention will be explained in further detail below with reference to the figures of which FIG. 1 shows in a schematic manner a system according to a first embodiment of the invention seen from above, FIG. 2 shows in a similar manner a modified embodiment of the invention, FIG. 3 shows an example of control components, connections etc. used in a system according to an embodiment of the invention, FIGS. 4 and 5 show embodiments corresponding to FIGS. 1 and 2, but with two take-away conveyors on each side, for example for handling different batching jobs, FIG. 6 shows a particular embodiment of lifting means for use in connection with a further embodiment of the invention, FIG. 7 shows a particular embodiment of batching means for use in connection with a still further embodiment of the invention, FIG. 8 shows batching means in the form of a small conveyor in accordance with an even further embodiment of the invention, FIG. 9 illustrates the use of separate batching means in connection with the invention, for example batching means as shown in FIGS. 7 and 8, and FIG. 10 shows still another embodiment of the invention, wherein the means for batch transport comprises take-away conveyors along the object transport means as well as essentially transversely hereto.

DETAILED DESCRIPTION

A system for batching of objects in accordance with an embodiment of the invention is illustrated seen from above in FIG. 1. Here, the objects 1 are delivered by means of supply transportation equipment comprising two feeding conveyors 2 and 4, and the objects 1 are fed to weighing machines 6 and 8, by means of which the mass of the objects are determined. The information regarding the individual masses are registered by means of e.g. a central control unit (not shown here). The objects 1 may for example be supplied with a velocity of 90 objects pr. minute to each of the two weighing machines 6 and 8, resulting in a total feeding velocity of 180 objects pr. minute. The objects may for example be supplied on the conveyors 2 and 4 with mutual (mean) distances of 0.25 meter, whereby the conveyor velocity would be 22.5 meter/minute.

When the weight or mass of the objects has been determined, they are transported further on by means for object transport 10 in the form of e.g. a conveyor belt. Here, a registration of the position and possibly the orientation and/or the type of the objects is performed by means of e.g. a vision system, scanning means or the like (not shown), and the information is registered by means of e.g. said central control unit. Thereby, the system will at any time know the position, the weight and possibly also the orientation and/or type of each object that has entered the means for object transport 10 and has been transported further on, for example based on the speed of the conveyor etc. The determination of the position etc., e.g. by means of scanning equipment, may take place earlier, e.g. prior to or simultaneously with the determination of the mass. However, this may lead to erroneous data concerning the position of the objects, since the position and/or orientation of the objects may change when they are transferred from one conveyor to the next, e.g. from a belt of the weighing machine 6 to the conveyor belt of the means for object transport 10. For example, an object may for a brief period be slowed down when passing the end gap between conveyors, thus resulting in the actual position of this object being slightly behind the position, which is e.g. calculated by a central control unit based on the speed of the conveyor(s), or an object may be shifted slightly sideward when passing the gap.

The means for object transport 10 may as shown be in the form of a single relatively wide conveyor belt, which for practical reasons may be preferable, but it will be understood that two or more separate conveyor belts placed alongside each other may be used as well.

The batching of the objects belonging to an assembly, for example an assembly of chicken parts with a predefined weight, is performed by placing the objects 1 on means for batch transport, which in the illustrated embodiment comprises two take-away conveyors 12 and 14, in order to produce batches as indicated by 9 on the take-away conveyor 14. As it will be explained in further detail later on, the objects may be batched on these conveyors and later transferred to a packaging, a tray etc., or they may be batched directly on or in such a packaging, a tray etc. that has been placed on the conveyor.

If the objects are batched in assemblies, batches or packages with four objects in each, and using the exemplary data given above regarding feeding velocity and mutual distance for the supplied objects 1, the speed of the take-away conveyors 12 and 14 can be determined. If for example the assemblies or batches are placed on the take-away conveyors 12 and 14 with a mutual distance (e.g. centre to centre) of 0.25 meter, it would be natural to advance the take-away conveyors with a speed of 22.5/4*0.25/0.25 meter/minute=5.625 meter/minute (Or in other words: the 180 objects that are delivered pr. minute result in 45 batches being made. These batches are transported by two conveyors, which each must transport 22.5 batches pr. minute. The 22.5 batches correspond to a distance of 22.5*0.25 meter=5.625 meter, which must be moved pr. minute).

The objects are moved from the means for object transport 10 to the means for batch transport 12 and 14 using a plurality of handling means of the robot type or robots, as they will also be referred to in the following. These robots are controlled by the central control unit in order to batch the objects based on the information available to the system regarding e.g. the mass and position of the objects available for the batching, the mass of objects possibly already placed on the conveyors 12 and 14 in unfinished batches and the desired parameters for the batches.

In FIG. 1, three such robots are used as illustrated by the effective area of operation for each of these, i.e. 20, 21 and 22, respectively. It is assumed that each robot will be able to operate within an essentially circular area, e.g. grip or pick-up an object 1 from the means for object transport 10 and place it on the means for batch transport 12 and 14 within the illustrated regions. However, it will be understood that other shapes of the effective operation area are possible, depending on the type of robot and/or the control equipment. Thus, the robots serve to selectively move objects from the means for object transport 10 and place them in batches on the means for batch transport 12 and 14 in an orderly form, for example in consideration of predetermined specifications and/or in order to achieve that the objects when placed in a packaging, possibly after being transferred from the conveyors 12 and 14, are presented in a nice and presentable manner.

With the exemplary data given above, each of the three robots thus has to move 60 objects pr. minute.

In FIG. 1 it is shown that both take-away conveyors of the means for batch transport is moving in the same direction, i.e. to the right in FIG. 1. However, it is apparent that one or both of these conveyors may be adapted for moving in the other direction, cf. for example FIG. 2, which shows an arrangement corresponding to FIG. 1, but where the direction of transport for the conveyor 14 is from the right to the left. The particular configuration may depend on, what is most practical in the particular circumstances. Further, in FIG. 2 it is shown that means for packaging 11, such as e.g. trays etc., may be placed, either manually or automatically on the take-away conveyors 12 and 14 and that the objects may be batched directly on or in these packaging means 11, thus avoiding the need to transfer the batches to packaging means at a later stage, thereby also avoiding that the mutual orderly form of the objects of a batch is disturbed.

The feeding of the objects 1 to the means for object transport 10 may be stopped (or reduced), if for example problems with one or more of the robots arise and/or if blocking problems have emerged, e.g. a blocking of take-away conveyor(s).

The above-mentioned exemplary data relating to feeding velocity, conveyor speeds etc. given above are not essential for the principle of the invention, but are merely chosen as examples and because such data are typical for a processing, e.g. slaughtering chain of the modern day chicken industry and because they are representative for the current level of the robot technology.

Further, it is noted that the objects 1 shown with dotted lines in the figures are only exemplary in nature and that actual sizes, distances, orientations will vary as will the dimensions of the components, e.g. conveyors comprised in a system. Further, it will be understood that the operational areas of the robots may overlap each other.

The above-mentioned control unit, which as mentioned is connected to the vision- or scanning system, comprises precise information regarding the position/location, orientation and possibly also type of the objects, whereby it is possible for it to control the robots to move the objects, e.g. lift the objects and place them on the take-away conveyors, including changing the orientation of the objects if necessary. Further, the control unit is connected to the weighing means or the means for determining the mass in other manners, whereby it also comprises weight information relating to each of the objects.

This control unit may be provided with software facilitating a selection of objects, which constitutes an optimal choice in consideration of the chosen package-operation. Such software may for example be software operating in accordance with the operating rules described in EP 781 172 or WO 01/22043. Thus, the batching may be performed in accordance with the so-called accumulation principle, i.e. by selecting and placing the objects in accordance with their weight and the weight of the objects already placed, or in accordance with the so-called combination principle, i.e. by selecting the object for a batch as a combination of items available for the selection, e.g. the objects present on the means for object transport 10. Other principles or combinations hereof may be used as well.

FIG. 3, which corresponds to FIG. 1, shows an example of control components, connections etc. used in a system according to an embodiment of the invention. A central control unit 30 is shown, which is connected 26 to the weighing or weight determinations means 6, 8 and connected 36 to scanning means 32. Further, the central control unit 30 may be connected 28 to the means for object transport 10 and connected 38 to the means for batch transport, e.g. 12 and 14. Evidently, the central control unit is also connected to the handling means of the robot type via connections 20*a*, 22*a* and 24*a*, respectively. The central control unit 30 may also be connected to the supply equipment 2 and 4 via a connection 40, for example in order to be able to stop these conveyors if necessary. It will be understood that the central control unit 30 may receive information from the respective conveyors and that it may also control these conveyors, for example it may be able to stop the advancing of a take-away conveyor if a batch is not finished, when the unfinished batch comes near the edge of the operation area of the last robot.

In accordance with the invention it is possible to have different batch or package sizes on the take-away conveyors, which may be preferable in certain circumstances. In accordance with the invention it is particularly advantageous to assemble two (or more) sizes of packages or batches simultaneously, since this may be effected with a particular size for each of the take-away conveyors. It is possible to provide even further take-away conveyors if found practical in order to provide a solution to the batching job. One way of performing such a job would be to divide (not necessarily in the middle) one or both of the conveyors 12 and 14 shown in FIG. 1, cf. FIG. 4, and having them transport packages to both sides, whereby four take-away conveyors 12*a*, 12*b*, 14*a* and 14*b* are provided. Another manner of achieving this may be by having two conveyors in parallel at one or both sides of the means for object transport 10, cf. FIG. 5, whereby also four take-away conveyors 12*a*, 12*b*, 14*a* and 14*b* are provided. Thus, three or four different package sizes may be batched simultaneously in an advantageous manner. It will be understood that these principles may be combined when configuring a system in accordance with the invention.

It is further emphasized that when batching two or more different package sizes, e.g. packages with different total weights, a further advantage is achieved since the packages may be assembled with actual weights being closer to the target weight, meaning that the give-away, i.e. the weight which exceeds the target weight, can be reduced. If for example only one size packages are batched having four objects and a target weight of 600 g, and the mean weight of the objects are 160 g, it is clear that the batching will result in a considerable amount of give-away. However, if it is possible to provide for the batching of another package size with a target weight of for example 700 g, a number of packages with such a target weight may be produced simultaneously, using predominantly the objects with the higher weight for these, and whereby the packages having a target weight of 600 g may be produced with a lower give-away weight.

According to a further embodiment the robots are equipped with means for gripping the objects, e.g. with means for pinching, grasping etc. the object, and the conveyors may be normal smooth conveyor belts.

According to another embodiment the robots may be equipped with L-shaped lifting means, for example being constructed using a plurality of thin rods or the like. Such an example of L-shaped lifting means 42 is shown in FIG. 6. Simultaneously, the means for object transport 10 may be provided in the form of a conveyor belt comprising a plurality of parallel strings or cords, e.g. a polycord conveyor (e.g. a conveyor with several parallel running cords instead of a belt), whereby the L-shaped lifting means 42 may be lowered down through the conveyor belt (with the rods 43 of the L-shaped lifting means 42 being placed in parallel with the cords or strings of the conveyor belt), under the object 1 that is selected and subsequently lifted upwards together with the selected object. When the L-shaped lifting means 42 is lifted up and lowered down through the cords or strings of the conveyor belt 10, the cords or strings will automatically move and allow the rods of the lifting means to pass, thereby providing the lifting and lowering as a simple operation. When the object is transferred from the L-shaped lifting means 42, this may be effected by having the lifting means perform a minor throwing or pitching movement, e.g. a pivoting movement. The bottom part of the L-shaped lifting means may be provided with spikes of knobs in order to keep the object in place during the movement.

According to the above-described embodiments the objects that are selected for a batch or package to be assembled on a take-away conveyor are picked and moved while the take-away conveyor moves along the means for object transport 10. This means that generally more than one robot will be involved in the batching, e.g. picking and moving of objects for a particular package or batch. This also means that all objects for a particular package must be picked and moved with a time limitation, since the objects must be selected and moved before the position in question on the take-away conveyor reaches the end of the means for object transport 10.

According to a still further embodiment the take-away conveyor comprises a plurality of parallel cords or strings or the like, e.g. a polycord conveyor, and the selected objects is placed by the robots on batching means, which according to this embodiment is in the form of a number of racks/rakes or grills, e.g. support members comprising a number of parallel rods, which may be lowered through the take-away polycord conveyor through the cords or strings. Such an arrangement is illustrated in FIG. 7, showing such a rack 46, upon which the objects for a batch 9 may be assembled while the rack 46 is immobile, meaning that the batching for a specific job is not put under a time constraint. When all objects constituting a batch 9 has been assembled on such a support member 46, the support member is lowered, whereby the objects for a batch or package simultaneously are transferred to the take-away conveyor, e.g. the take-away conveyor 14*a*, a part of which is shown in FIG. 7. In contrast to the above-described embodiments this means that all objects for a specific batch is picked by one and the same robot and that a time limitation is not present, i.e. meaning that all necessary time may be used for finishing a specific batch.

Alternatively, a number of small conveyors may be used as batching means instead, e.g. small batching conveyors whereupon the objects for a specific batch are collected on each one. Such an example of batching means is shown in FIG. 8. These conveyors are not moving while the objects are selected, picked and placed on the conveyors. As shown in FIG. 8, the conveyors 48 may be placed above the take-away conveyors, for example the take-away conveyor 14, allowing objects to pass freely on the take-away conveyor. As shown, a supporting frame 49 or the like, which is arranged to go clear of the take-away conveyor below, may be connected to a roller of the small batching conveyor 48. When a batch 9 has been finished on such batching means in the form of a small conveyor 48, the batch 9 can be delivered to the take-away conveyor 14, for example by tilting the conveyor 48 down towards the take-away conveyor 14 and by activating the conveyor, e.g. moving the conveyor belt 50 in the indicated direction, whereby the objects are transferred to the take-away conveyor 14 without being moved in relation to each other, thus maintaining the orderly form, in which the objects have been placed by the robot(s).

The arrangement using such small batching conveyors 48 or the like is also shown in FIG. 9, which corresponds to FIG. 1, e.g. showing a system according to the invention seen from above in a schematic manner. Here, it is shown that a number of small batching means, for example small batching conveyors 48 are placed above the take-away conveyors 12 and 14. In the example, for the sake of clarity, only two small batching conveyors 48 are provided for each robot, i.e. one on each side. However, it will be understood that a plurality of such small batching means may be provided at each side of each robot, allowing a robot to work with several batches at any time. As explained above, such batching means may be small conveyors 48 that may be used in conjunction with plain take-away conveyors, but the batching means may also be racks, grills, etc. as also described above, that may be used in conjunction with special types of take away conveyors, for example polycord conveyors or the like.

In alternative embodiments traditional conveyor belts are used instead of polycord conveyors, e.g. belts comprising several parallel cords or strings etc. These traditional conveyor belts are instead provided with elevations, e.g. knobs, spikes, etc. which provide the same functionality as the conveyors with parallel strings. A particular device for cleaning such conveyors may be arranged in the form of a device with a mill-wing shaped scraper and/or brushing unit, possibly with the use of hot water etc. A drying unit may also be provided subsequently for the circumstances where water on the belts must be avoided.

According to a still further embodiment the objects for a batch are not collected and transferred to a location for transfer to a packaging means such as a tray etc. Instead, the objects for a package or batch are delivered directly into or onto the packaging means. Thus, the risk that the objects may be moved in relation to each other when they are transferred to a packaging means is avoided. However, the form wherein a separate batching means in the form of e.g. a small conveyor is used is not particularly advantageous in this connection when the packaging means, e.g. a tray or the like is produced on the spot for example according to current popular methods, where e.g. a tray is shaped when it is needed. Instead, the empty packaging means may be placed on the take-away conveyors, either automatically or manually, and the batching is effected as described above directly on the packaging means. If the time limitation is an issue, arrangements may be made for recirculating non-finished batches. For example, it may be possible to direct a packaging means to be transported down along one side and in the opposite direction along the other side of the means for object transport 10. Instead, provisions may be made in order to bring a take-away conveyor to a halt, if the batching for a packaging means has not been finished.

According to an even further embodiment, whereby the options for placing the objects in a number of batching locations are enhanced, is illustrated in FIG. 10, which essentially corresponds to FIG. 2. Here, it is shown that take-away conveyors 60, 61, 62 and 63 may also be placed essentially transversely to the take-away conveyors 12 and 14 and placed for example above these, allowing objects to pass underneath these transverse take-away conveyors, for example objects being transported on the means for object transport 10 and batches or packages being batched on the take-away conveyors 12 and 14. It will be understood, though, that other configurations are possible, for example with the take-away conveyors 12 and 14 placed above the transverse conveyors 60-63. No objects e.g. commenced batches or packages has been shown on the take-away conveyors in FIG. 10 for the sake of clarity, but it will be understood that such batches or packages may be in the process of being built on the take-away conveyors 12 and 14 as well as on the transverse take-away conveyors 60-63, while these are moving or possibly stopped. According to this embodiment, a robot may select and deliver objects to batching locations on four sides of the robot, thus enhancing the possibility of successfully building up packages. Further, if it should happen that a take-away conveyor should be stopped because a batch has not been finished before leaving the operation area, this will not be as critical as in the arrangement where take-away conveyors are present on two sides only, since each of the robots will have the possibility of delivering objects to batch locations on three sides instead of only one side. As described above, the objects may be batched directly on the take-away conveyors for later transferral to packaging means, or the objects may be batched directly on or in such packaging means that may be supplied manually or automatically. The transverse conveyors 60-63 may all be moved in the same direction and they may deliver the batches to for example a collecting conveyor (not show in FIG. 10) or the batches or packages may be handled in another manner, which will be apparent to the skilled person. It will further be understood that the embodiment shown in FIG. 10 may also comprise the use of arrangements as shown in FIGS. 7 and 8, e.g. batching means which are immobile while a batch is being built but will deliver a finished batch to a take-away conveyor.

Further, it is mentioned that the weight or mass of the objects may be determined in other manners than by weighing as also indicated above. For example, a determination of the weight may be effected using vision equipment, possibly simultaneously with the scanning of the objects that take place in order to determine the position, the orientation and possibly also the type of the objects. Other means and methods for determining the mass of the objects may also be utilized, which will be comprised by the patent claims.

As regards the handling means of the robot type, e.g. the robots, which they simply also has been referred to as being in the above, it will be apparent to a skilled person that various types and makes may be used in connection with the present invention. Essentially, the handlings means of the robot type may comprise means for selectively gripping, picking, lifting or in general handling the objects, controlled by the control means 30, and further, they may be configured for controllably moving the objects to a desired location, also controlled by the control means 30, for example by moving the object to the location and dropping/releasing the object, possibly after having oriented the object, or for example by throwing the object to the desired location. It will be apparent to the skilled person that various robot arrangements may be used within the scope of the claims.

The invention claimed is:

1. A method of batching supplied objects in batches, wherein each batch fulfills a predefined criteria of total weight range, said method comprising the steps of:
   determining the weight of each object;
   transporting the objects via a means for object transport;

selectively transferring the objects from the means for object transport to a batching means using a plurality of robotic handling means, wherein said robotic handling means is adapted for selectively gripping or picking up an object and for depositing said object at a selected depositing position within an area of operation, and wherein objects are selectively transferred within the area of operation from the means for object transport to a batching means using said robotic handling means, said batching means being located on one of a plurality of conveyors;

batching the objects based on said predefined criteria, wherein a batch of objects on said batching means comprises objects transferred to the batching means by at least two of said robotic handling means; and transporting a batch of the objects on a means for batch transportation comprising said plurality of conveyors.

2. The method of claim 1, wherein the objects are supplied to said means for object transport by one or more conveyor bands.

3. The method of claim 1, further comprising the step of registering the objects based one or more of object position, object type and/or object orientation by means of vision equipment, the step of registering being performed in connection with the determination of the weight of each object.

4. The method of claim 1, wherein the means for batch transportation includes the batching means, and further wherein the objects are batched directly on said means for batch transportation.

5. The method of claim 1, wherein the objects are batched on a separate unit that constitutes said batching means, the method further comprising the step of transferring the batch of objects to said means for batch transportation by one or more of an essentially vertical movement, a pivoting movement and/or a displacement by another conveyor.

6. The method of claim 1, wherein the step of batching includes the step of batching the objects in a predefined orderly form in relation to each other.

7. The method of claim 1, wherein the means for object transport and/or the means for batch transportation are moved continuously during the batching of the objects.

8. The method of claim 1, wherein said means for object transport and/or said means for batch transportation are moved discontinuously during the batching of the objects.

9. The method of claim 1, wherein the means for object transport comprises one or more conveyor bands.

10. The method of claim 1, wherein the conveyor of the means for batch transportation moves in an opposite direction of the means for object transport.

11. The method of claim 1, wherein the conveyor of the means for batch transportation moves in a same direction as the means for object transport.

12. The method of claim 1, further comprising the step of transferring the batch from said means for batch transportation to a packaging means.

13. The method of claim 1, wherein the step of batching occurs on a packaging means that is located on said means for batch transportation or located on said batching means.

14. The method of claim 1, further comprising the steps of:
redirecting the batch of objects to a feeding end of the means for batch transportation; and
supplying one or more missing objects to the batch.

15. A system for batching supplied objects in batches, wherein each batch fulfills a predefined criteria of total weight range said system comprising:
means for registering the objects based on one or more of object position, object type and/or object orientation;
means for determining the weight of the objects;
means for transporting the objects;
a plurality of controllable robotic handling means for selective transfer of objects from said means for transporting to a batch of objects, said robotic handling means being adapted to selectively grip or pick up an object and to deposit said object at a selected depositing position on one of a plurality of conveyors within an area of operation; and
means for batch transporting for transporting said batch of objects, said means for batch transporting comprising said plurality of conveyors, and a control unit for controlling said controllable robotic handling means based on said predefined criteria and based on registered and/or determined data for the objects, wherein a batch of objects comprises objects transferred to the batch by at least two of said robotic handling means.

16. The system of claim 15, further comprising supply transportation equipment for supplying the objects.

17. The system of claim 15, further comprising vision equipment for registering said objects, said registration being performed in connection with the determination of the weight of the objects.

18. The system of claim 15, wherein the objects are batched directly on said means for batch transporting.

19. The system of claim 15, wherein the controllable handling means of the robot type are controlled in such a manner that the objects are batched in a predefined orderly form in relation to each other.

20. The system of claim 15, wherein the means for transporting the objects and/or said means for batch transporting are configured for moving continuously during the batching of the objects.

21. The system of claim 15, wherein the means for transporting the objects and/or said means for batch transporting are configured for moving discontinuously during the batching of the objects.

22. The system of claim 15, wherein the means for transporting the objects comprises one or more conveyor bands.

23. The system of claim 15, wherein one or more of said plurality of conveyors are adapted for moving in an opposite direction of said means for transporting the objects.

24. The system of claim 15, wherein one or more of said plurality of conveyors are adapted for moving in the same direction as said means for transporting the objects.

25. The system of claim 15, wherein each of said plurality of controllable robotic handling means includes one or more of gripping means, picking means and/or lifting means for removing the objects from the means for transporting the objects.

26. The system of claim 22, wherein each of said one or more conveyor bands are a polycord conveyor.

27. The system of claim 22, wherein each of said one or more conveyor bands include knobs or spikes.

28. The system of claim 27, wherein each of said plurality of controllable robotic handling means includes a finger for gripping the objects from the means for transporting the objects, wherein said finger is substantially horizontally oriented with a mutual distance allowing the finger to be lowered down between said knobs or spikes.

29. The system of claim 15, further comprising means for batching the objects, whereon the objects are batched, said means for batching being adapted and controlled so that a batched assembly of objects can be transferred to said means for batch transporting.

30. The system of claim 29, wherein said means for batching comprises one or more separate conveyors, which are arranged to be immovable when a batching of objects to such a separate conveyor takes place.

31. The system of claim 30, wherein said one or more separate conveyors are located above said means for batch transporting and can be rotated and/or tilted in such a manner that a batch of objects can be transported down onto said means for batch transporting.

32. The system of claim 29, wherein said means for batch transporting comprises conveyor bands having longitudinal separate elements with knobs or spikes.

33. The system of claim 32, wherein said means for batching comprises one or more support units that are moveable in a vertical direction and that include horizontally oriented finger elements, wherein said finger elements can pass between said longitudinal separate elements on the conveyor or can be lowered down between said knobs or spikes.

34. The system of claim 15, wherein a batch of objects can be transferred from said means for batch transporting to a tray.

35. The system of claim 29, wherein said system is configured to batch objects directly on a packaging means that is placed on said means for batch transporting or said means for batching.

36. The system of claim 15, further comprising means for redirecting a batch of objects to a feeding end of said means for batch transporting for supplying of one or more missing objects.

37. The system of claim 15, wherein the system is configured to provide a plurality of types of batches.

38. The system of claim 15, wherein the means for batch transporting is parallel with the means for transporting the objects.

39. The system of claim 38, wherein the means for batch transporting is parallel with the means for transporting the objects in an area corresponding to the operation area of the controllable robotic handling means.

40. The system of claim 39, wherein the means for batch transporting includes two conveyor belts on one side of the means for transporting the objects and two conveyor belts on another side of the means for transporting the objects, wherein said two conveyor belts on one side move in an opposite direction from said two conveyor belts on another side.

41. The system of claim 40, wherein the means for batch transporting includes a conveyor that is transverse to the means for transporting objects.

42. The method of claim 1, wherein each batch further fulfills a predefined criteria of one or more of object weight, object orientation, object type and/or the number of objects.

43. The system of claim 15, wherein each batch further fulfills a predefined criteria of one or more of object weight, object orientation, object type and/or the number of objects.

* * * * *